(12) United States Patent
Chen et al.

(10) Patent No.: US 9,009,501 B2
(45) Date of Patent: Apr. 14, 2015

(54) POWER SUPPLY CONTROL CIRCUIT

(75) Inventors: Chun-Sheng Chen, New Taipei (TW); Feng-Long He, Shenzhen (CN); Hua Zou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 402 days.

(21) Appl. No.: 13/461,732

(22) Filed: May 1, 2012

(65) Prior Publication Data

US 2013/0047018 A1   Feb. 21, 2013

(30) Foreign Application Priority Data

Aug. 15, 2011  (CN) .......................... 2011 1 0232291

(51) Int. Cl.
G06F 1/26 (2006.01)
G06F 1/32 (2006.01)

(52) U.S. Cl.
CPC ............ *G06F 1/3206* (2013.01); *G06F 1/3287* (2013.01)

(58) Field of Classification Search
None
See application file for complete search history.

(56) References Cited

U.S. PATENT DOCUMENTS

| 2010/0125743 | A1* | 5/2010 | Yeh et al. ...................... 713/320 |
| 2010/0332870 | A1 | 12/2010 | Chen et al. |
| 2011/0197084 | A1* | 8/2011 | Xi .................................. 713/323 |
| 2012/0042184 | A1* | 2/2012 | Yeh et al. ...................... 713/323 |

FOREIGN PATENT DOCUMENTS

| TW | 200826409 | 6/2008 |
| TW | 201115321 | 5/2011 |

* cited by examiner

*Primary Examiner* — Paul Yanchus, III
(74) *Attorney, Agent, or Firm* — Novak Druce Connolly Bove + Quigg LLP

(57) ABSTRACT

A power supply control circuit for an electronic device includes an input/output (I/O) microchip, a southbridge microchip and a power management unit. The control circuit is electrically connected to the I/O microchip and the southbridge microchip to output a driving voltage to the I/O microchip and the southbridge microchip. The power management unit includes a power management microchip electrically connected to the control circuit, the I/O microchip and the southbridge microchip. The power management microchip outputs a power on/off control signal to the southbridge microchip to power on/off the electronic device, and controls the control circuit to provide a driving voltage to the I/O microchip and the southbridge microchip when the electronic device is powered on and controls the control circuit to stop providing the driving voltage to the I/O microchip and the southbridge microchip when the electronic device is powered off.

9 Claims, 1 Drawing Sheet

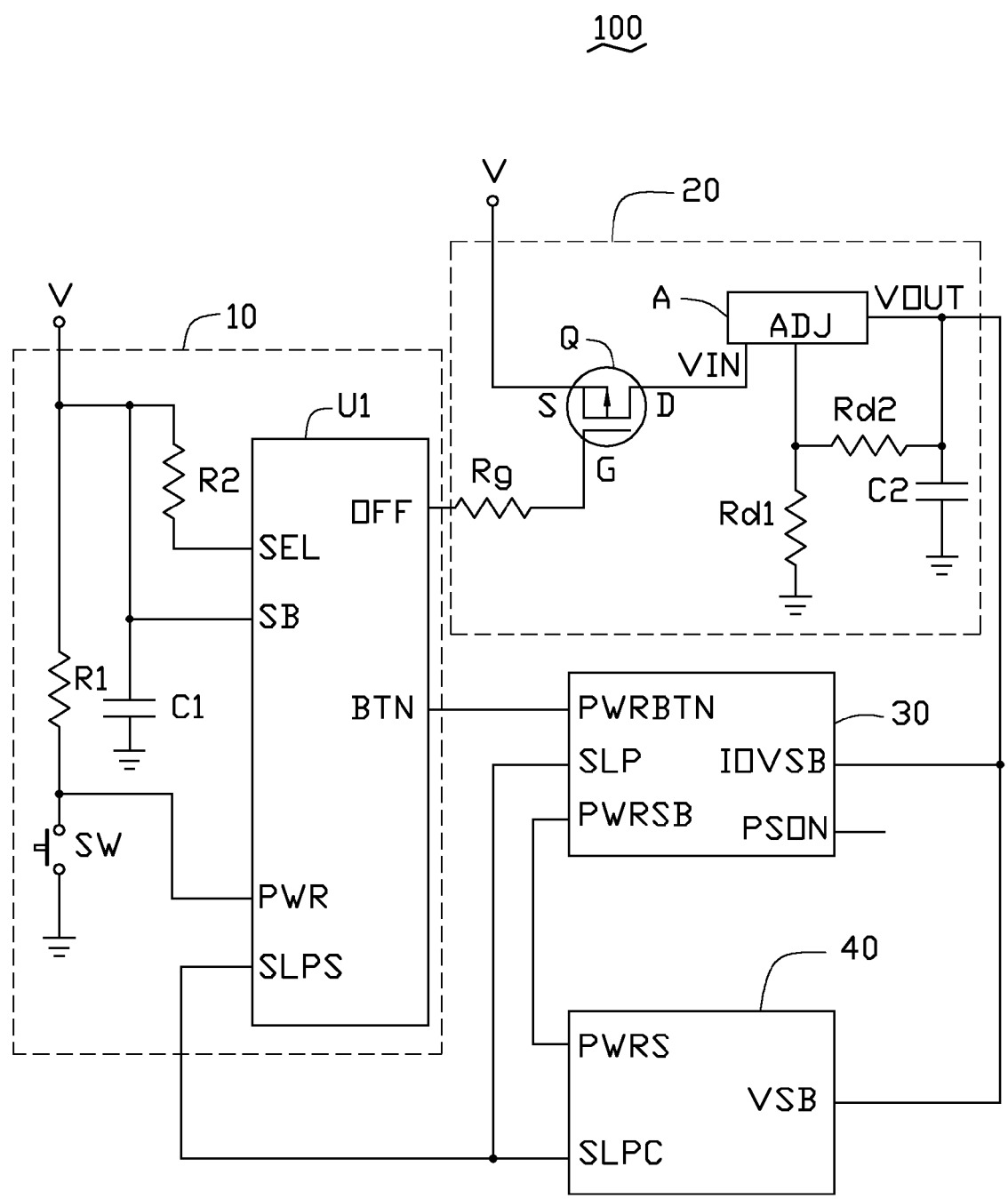

POWER SUPPLY CONTROL CIRCUIT

BACKGROUND

1. Technical Field

The disclosure generally relates to power supply control circuits, and particularly to a power supply control circuit for an electronic device such as a personal computer.

2. Description of Related Art

When a personal computer is powered off or in a standby mode, the personal computer may still draw power provided by a standby power supply. A power draw of the personal computer that is powered off may be about 0.5 w-0.8 w, which wastes power. Therefore, it is necessary to reduce the power consumption of the personal computer when it is powered off.

Therefore, there is room for improvement within the art.

BRIEF DESCRIPTION OF THE DRAWING

Many aspects of the present disclosure can be better understood with reference to the drawing. The components in the drawing are not necessarily drawn to scale, the emphasis instead being placed upon clearly illustrating the principles of the disclosure.

The FIGURE is a circuit diagram of a power supply control circuit, according to an exemplary embodiment of the disclosure.

DETAILED DESCRIPTION

The FIGURE is a circuit diagram of a power supply control circuit 100, according to an exemplary embodiment of the disclosure. The power supply control circuit 100 includes a power management unit 10, a control circuit 20, an input/output (I/O) microchip 30 and a southbridge microchip 40. The power supply control circuit 100 is used in an electronic device such as a personal computer to save power when the personal computer is powered off.

The power management unit 10 includes a power management microchip U1, a switch SW, a first resistor R1, a second resistor R2 and a first capacitor C1. In one embodiment, the power management microchip U1 includes a power supply terminal SB, a power on/off detecting terminal PWR, a mode setting terminal SEL, a voltage control signal output terminal OFF, a power on/off control signal output terminal BTN and an power off identifying terminal SLPS.

The power supply terminal SB is electrically connected to a standby power supply V to obtain a working voltage. The power supply terminal SB is also grounded by the first capacitor C1. In one embodiment, the standby power supply V is about 5V.

The power on/off detecting terminal PWR is electrically connected to the standby power supply V by the first resistor R1, and also grounded by the switch SW. The switch SW is configured for powering on/powering off the electronic device. When the switch SW is turned on, the detecting terminal PWR is grounded and the electronic device is powered off. When the switch SW is turned off, the power on/power off detecting terminal PWR is electrically connected to the standby power supply V and the electronic device is powered on.

The mode setting terminal SEL is electrically connected to the standby power supply V by the second resistor R2 and also electrically connected a basic input/output system (BIOS) (not shown) of the electronic device. The power management microchip U1 includes a normal working mode and a power saving mode. The mode setting terminal SEL is configured for setting modes of the power management microchip U1 by the BIOS. In one embodiment, when the mode setting terminal SEL is enabled by a low level voltage (e.g., logic 0), the power management microchip U1 is in the normal working mode. When the power save mode setting terminal SEL is enabled by a high level voltage (e.g., logic 1), the power management microchip U1 is in the power saving mode.

The voltage control signal output terminal OFF is electrically connected to the control circuit 20. When the electronic device is powered on, the voltage control signal output terminal OFF outputs a first control signal to the control circuit 20, which may be a low level voltage (e.g., logic 0). When the electronic device is powered off, and the power management microchip U1 is in the power saving mode, the voltage control signal output terminal OFF outputs a second control signal to the control circuit 20, which may be a high level voltage (e.g., logic 1). When the electronic device is powered off, and the power management microchip U1 is in the normal working mode, the voltage control signal output terminal OFF outputs a third control signal to the control circuit 20, which may be a logic low voltage.

The power on/off control signal output terminal BTN is electrically connected to the southbridge microchip 40 by the I/O microchip 30. The power on/off control signal output terminal BTN outputs a power on/power off control signal to the southbridge microchip 40 according to operations to the switch SW. The southbridge microchip 40 can control the electronic device to be powered on/powered off through the I/O microchip 30.

The power off identifying terminal SLPS is electrically connected to the southbridge microchip 40. The power off identifying terminal SLPS receives a notification signal from the southbridge microchip 40 and determines whether the electronic device is powered off according to the notification signal. In one embodiment, if the notification signal is a logic low voltage signal, the power off identifying terminal SLPS determines that the electronic device is powered off.

The control circuit 20 includes a transistor Q, a gate resistor Rg, a voltage regulator A, a first voltage dividing resistor Rd1, a second voltage dividing resistor Rd2 and a second capacitor C2.

In one embodiment, the transistor Q can be a P-channel depletion metal-oxide semiconductor. A gate of the transistor Q is electrically connected to the first output terminal OFF. A source of the transistor Q is electrically connected to the standby power supply V. A drain of the transistor Q is electrically connected to the voltage regulator A.

The voltage regulator A includes a voltage input terminal VIN, a voltage regulating terminal ADJ and a voltage output terminal VOUT. The voltage input terminal VIN is electrically connected to the drain D of the transistor Q. The voltage regulating terminal ADJ is grounded by the first voltage dividing resistor Rd1 and also grounded by the second voltage dividing resistor Rd2 and the second capacitor C2 connected in series. The voltage output terminal VOUT is electrically connected to the southbridge microchip 40 and also grounded by the second capacitor C2. The voltage output terminal VOUT outputs a driving voltage VOUT to the southbridge microchip 40. In one embodiment, the driving voltage VOUT can be about 3V.

The I/O microchip 30 includes a power supply terminal IOVSB, an input terminal PWRBTN, an output terminal PWRSB, a power on/off identifying terminal SLP and a power on/off terminal PSON.

The power supply terminal IOVSB is electrically connected to the output terminal of the voltage regulator A and obtains the driving voltage VOUT from the voltage regulator A. The input terminal PWRBIN is electrically connected to the power on/off control signal output terminal BTN of the power management unit U1 to receive the power on/off control signal from the power management unit U1. The output terminal PWRSB is electrically connected to the southbridge microchip 40 to send the power on/off control signal to the south bridge 40.

The power on/off identifying terminal SLP is electrically connected to the southbridge microchip 40 to receive a power on/off signal from the southbridge microchip 40. The power on/off terminal PSON is configured for powering on/off the electronic device according to the power on/off signal. In one embodiment, when the power on/off identifying terminal SLP receives the power on trigger signal from the southbridge microchip 40, the power on/off terminal PSON is set to be at a low level voltage (e.g., logic 0), and the electronic device is powered on. When the power on/off identifying terminal SLP receives the power off trigger signal from the southbridge microchip 40, the control terminal PSON is set to be at a high level voltage (e.g., logic 1), and the electronic device is powered off.

The southbridge microchip 40 includes a power supply terminal VSB, a power on/off signal input terminal PWRS, and a power on/off enable terminal SLPC. The power supply terminal VSB is electrically connected to the output terminal of the voltage regulator A and obtains the driving voltage VOUT from the voltage regulator A. The power on/off signal input terminal PWRS is electrically connected to the power on/off signal output terminal PWRSB to receive the power on/off control signal. The power on/off enable terminal SLPC is electrically connected to the powered on/off identifying terminal SLP and the power off identifying terminal SLPS. When the southbridge microchip 40 receives the power on control signal, the power on/off terminal SLPC sends the power on trigger signal to the power on/off identifying terminal SLP. When the southbridge microchip 40 receives the power off control signal, the power on/off terminal SLPC sends a power off trigger signal to the power on/off identifying terminal SLP and also sends the notification signal to the power off identifying terminal SLPS.

When the switch SW is turned off to power on the electronic device, the voltage control signal output terminal OFF outputs the first control signal to the transistor Q. The transistor Q is turned on. The voltage regulator A outputs a driving voltage VOUT to the I/O microchip 30 and to the southbridge microchip 40. The power on/off control signal output terminal BTN outputs the power on control signal to the southbridge microchip 40 by the I/O microchip 30. The southbridge microchip 40 sends the power on trigger signal to the power on/off identifying terminal SLP. The power on/off terminal PSON is set to be at a logic low voltage (e.g., logic 0) and the electronic device is powered on.

When the switch SW is turned on to power off the electronic device, the power on/off control signal output terminal BTN outputs a power off control signal to the southbridge microchip 40 by the I/O microchip 30. The power on/off enable terminal SLPC outputs the power off trigger signal to the power on/off identifying terminal SLP. The power on/off terminal PSON is set to be at a logic high voltage (e.g., logic 1) and the electronic device is powered off.

In addition, the southbridge microchip 40 also outputs the notification signal to the power off identifying terminal SLPS. The power management unit U1 determines that the electronic device is powered off according to the notification signal. If the power management U1 is in the normal working mode, the voltage control signal output terminal OFF outputs the second control signal to the gate G. The transistor Q is turned on. The voltage regulator A outputs the driving voltage to the I/O microchip 30 and the southbridge microchip 40 as normal. If the power management unit U1 is in the power saving mode, the voltage control signal output terminal OFF outputs the third control signal to the gate G. The transistor Q is turned off. The voltage regulator A stops outputting the driving voltage to the I/O microchip 30 and the southbridge microchip 40. Therefore, the overall power consumption of the I/O microchip 30 and of the southbridge microchip 40 are significantly reduced when the electronic device is powered off.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A power supply control circuit for an electronic device, the power supply control circuit comprising:
   an input/output (I/O) microchip;
   a southbridge microchip electrically connected to the I/O microchip;
   a control circuit electrically connected to the I/O microchip and the southbridge microchip; and
   a power management unit comprising a power management microchip electrically connected to the control circuit, the I/O microchip and the southbridge microchip;
   wherein the control circuit comprises a transistor, a voltage regulator, a first voltage dividing resistor, a second voltage dividing resistor, and a first capacitor, the voltage regulator comprises a voltage input terminal electrically connected to a drain of the transistor, a voltage regulating terminal and a voltage output terminal electrically connected to the I/O microchip and the southbridge microchip, the voltage regulating terminal is grounded by the first voltage dividing resistor and grounded by the second voltage dividing resistor and the first capacitor connected in series;
   wherein the power management microchip outputs a power on/off control signal to the southbridge microchip to power on/off the electronic device, and controls the control circuit to provide a driving voltage to the I/O microchip and the southbridge microchip when the electronic device is powered on and controls the control circuit to stop providing the driving voltage to the I/O microchip and the southbridge microchip when the electronic device is powered off.

2. The power supply control circuit of claim 1, wherein the power management microchip comprises a mode setting terminal; when the mode setting terminal is enabled by a low level voltage, the power management microchip is in a normal working mode; when the power save mode setting terminal is enabled by a high level voltage, the power management microchip is in a power saving mode.

3. The power supply control circuit of claim 2, wherein the power management microchip comprises a voltage control signal output terminal electrically connected to the control circuit, when the electronic device is powered off and the power management microchip is in the power saving mode, the voltage control signal output terminal outputs a high level control signal, when the electronic device is powered off and the power management microchip is in the normal working mode or when the electronic device is powered on the voltage control signal output terminal outputs a low level control signal.

4. The power supply control circuit of claim 3, wherein a gate of the transistor is electrically connected to the voltage control signal output terminal, a source of the transistor is electrically connected to a standby power supply, the drain of the transistor is electrically connected to the voltage regulator, the voltage regulator is electrically connected to the I/O microchip and the southbridge microchip to provide the driving voltage.

5. The power supply control circuit of claim 1, wherein the power management unit comprises a switch, the power management microchip comprises a power on/off signal detecting terminal grounded by the switch and also electrically connected to a standby power supply by a first resistor.

6. The power supply control circuit of claim 5, wherein the power management microchip comprises a power on/off control signal output terminal electrically connected to the southbridge microchip by the I/O microchip, when the switch is turned on, the power on/off control signal output terminal sends a power off control signal to the southbridge microchip; when the switch is turned off, the power on/off control signal output terminal sends a power on control signal to the southbridge microchip.

7. The power supply control circuit of claim 6, wherein the I/O microchip comprises a power on/off identifying terminal, the southbridge microchip comprises a power on/off enable terminal electrically connected to the power on/off identifying terminal, when the southbridge microchip receives the power on control signal from the power management microchip, the power on/off enable terminal sends a power on trigger signal to the power on/off identifying terminal to power on the electronic device; when the southbridge microchip receives the power off control signal from the power management microchip, the power on/off enable terminal sends a power off trigger signal to the power on/off identifying terminal to power off the electronic device.

8. The power supply control circuit of claim 7, wherein the power management microchip comprises a power off identifying terminal, when the southbridge microchip receives the power off control signal from the power management microchip, the power on/off enable terminal sends a notification signal to the power off identifying terminal.

9. The power supply control circuit of claim 7, wherein the I/O microchip comprises a power on/off terminal, the power on/off terminal PSON is set to be at a low level voltage, and the electronic device is powered on, when the control terminal is set to be at a high level voltage, and the electronic device is powered off.

\* \* \* \* \*